United States Patent
Goyal et al.

(10) Patent No.: US 9,060,324 B1
(45) Date of Patent: Jun. 16, 2015

(54) FREQUENCY SELECTION FOR EXCHANGING WIRELESS COMMUNICATIONS

(75) Inventors: Anoop Kumar Goyal, Overland Park, KS (US); Siddharth S. Oroskar, Overland Park, KS (US); Manoj Shetty, Overland Park, KS (US); Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1067 days.

(21) Appl. No.: 13/037,885

(22) Filed: Mar. 1, 2011

(51) Int. Cl.
*H04W 40/04* (2009.01)
*H04W 48/16* (2009.01)
*H04W 48/18* (2009.01)
*H04W 48/20* (2009.01)
*H04W 48/04* (2009.01)
*H04W 36/28* (2009.01)
*H04W 36/26* (2009.01)

(52) U.S. Cl.
CPC .............. *H04W 48/04* (2013.01); *H04W 48/18* (2013.01); *H04W 48/20* (2013.01); *H04W 36/28* (2013.01); *H04W 36/26* (2013.01)

(58) Field of Classification Search
None
See application file for complete search history.

(56) References Cited

U.S. PATENT DOCUMENTS

| | | | |
|---|---|---|---|
| 5,034,993 A | 7/1991 | Sasuta et al. | |
| 5,222,249 A | 6/1993 | Carney | |
| 5,355,522 A | 10/1994 | Demange | |
| 5,758,090 A * | 5/1998 | Doner | 709/236 |
| 6,608,593 B2 | 8/2003 | Holt | |
| 7,050,402 B2 | 5/2006 | Schmidl et al. | |
| 7,171,160 B2 | 1/2007 | Chuah et al. | |
| 7,263,072 B2 | 8/2007 | Martinez | |
| 7,496,368 B2 | 2/2009 | Zimmermann et al. | |
| 7,840,187 B2 | 11/2010 | Ji | |
| 8,290,527 B2 * | 10/2012 | Richardson | 455/522 |
| 2003/0052821 A1 | 3/2003 | Holt | |
| 2005/0271009 A1 * | 12/2005 | Shirakabe et al. | 370/329 |
| 2011/0261765 A1 * | 10/2011 | Nagaraja | 370/329 |

* cited by examiner

*Primary Examiner* — Christopher Crutchfield (57) ABSTRACT

A wireless communication device comprises a wireless communication transceiver and a processing system. The wireless communication transceiver is configured to detect first and second frequencies transmitted from a wireless access node and to receive first and second threshold values transmitted from the wireless access node. The processing system is configured to determine a distance between the wireless communication device and the wireless access node, compare the distance to the first threshold value, and if the distance falls below the first threshold value, select the first frequency. The processing system is further configured to compare the distance to the second threshold value, and if the distance exceeds the second threshold value, select the second frequency. The wireless communication transceiver is configured to exchange wireless communications with the wireless access node using the selected frequency.

18 Claims, 6 Drawing Sheets

FREQUENCY SELECTION FOR EXCHANGING WIRELESS COMMUNICATIONS

TECHNICAL BACKGROUND

Wireless communication networks include wireless access nodes that are typically utilized by wireless communication devices to communicate with further communication networks and equipment. A wireless communication device communicates with a serving wireless access node by establishing a wireless communication link with the access node using a radio frequency (RF) signal. Typically, the RF signal is transmitted by the wireless access node at a particular frequency or frequency band. Once the wireless communication link is established, the wireless access node exchanges user communications with the wireless communication device and with other systems of a communication network, such as gateways, service nodes, and mobile switching centers, to ultimately provide a communication service to the wireless device.

Some wireless access nodes may simultaneously transmit multiple RF signals over disparate frequency bands of the spectrum, which typically have different signal characteristics. For example, lower frequencies tend to encounter less propagation loss as compared to higher frequencies, so lower frequencies may propagate farther and have a larger RF coverage area than higher frequencies. Modern wireless communication devices may be able to establish a wireless communication link with such wireless access nodes using any of the available frequency bands transmitted by these nodes. For example, if a wireless access node transmits RF signals at both 1,000 and 2,000 megahertz, a compatible wireless communication device could communicate with the wireless access node using either of these two frequencies.

Overview

A wireless communication device comprises a wireless communication transceiver and a processing system. The wireless communication transceiver is configured to detect first and second frequencies transmitted from a wireless access node and to receive first and second threshold values transmitted from the wireless access node. The processing system is configured to determine a distance between the wireless communication device and the wireless access node, compare the distance to the first threshold value, and if the distance falls below the first threshold value, select the first frequency. The processing system is further configured to compare the distance to the second threshold value, and if the distance exceeds the second threshold value, select the second frequency. The wireless communication transceiver is configured to exchange wireless communications with the wireless access node using the selected frequency.

A method of operating a wireless communication device is also disclosed. The method comprises detecting first and second frequencies transmitted from a wireless access node, and receiving first and second threshold values transmitted from the wireless access node. The method further comprises determining a distance between the wireless communication device and the wireless access node, comparing the distance to the first threshold value, and if the distance falls below the first threshold value, selecting the first frequency. The method further comprises comparing the distance to the second threshold value, and if the distance exceeds the second threshold value, selecting the second frequency. The method further comprises exchanging wireless communications with the wireless access node using the selected frequency.

A wireless communication device comprises a wireless communication transceiver and a processing system. The wireless communication transceiver is configured to detect first and second frequencies transmitted from a wireless access node and to receive first and second threshold values transmitted from the wireless access node, wherein the second threshold value exceeds the first threshold value and wherein the first frequency exceeds the second frequency. The processing system is configured to determine a distance between the wireless communication device and the wireless access node, compare the distance to the first threshold value, and if the distance falls below the first threshold value, select the first frequency. The processing system is further configured to compare the distance to the second threshold value, and if the distance exceeds the second threshold value, select the second frequency. If the distance exceeds the first threshold value but falls below the second threshold value, the processing system is configured to direct the wireless communication transceiver to transmit a request for a selection of the first and second frequencies for delivery to the wireless access node, wherein the wireless access node is configured to select between the first and second frequencies based on an altitude of the wireless communication device. The wireless communication transceiver is configured to exchange wireless communications with the wireless access node using the selected frequency.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
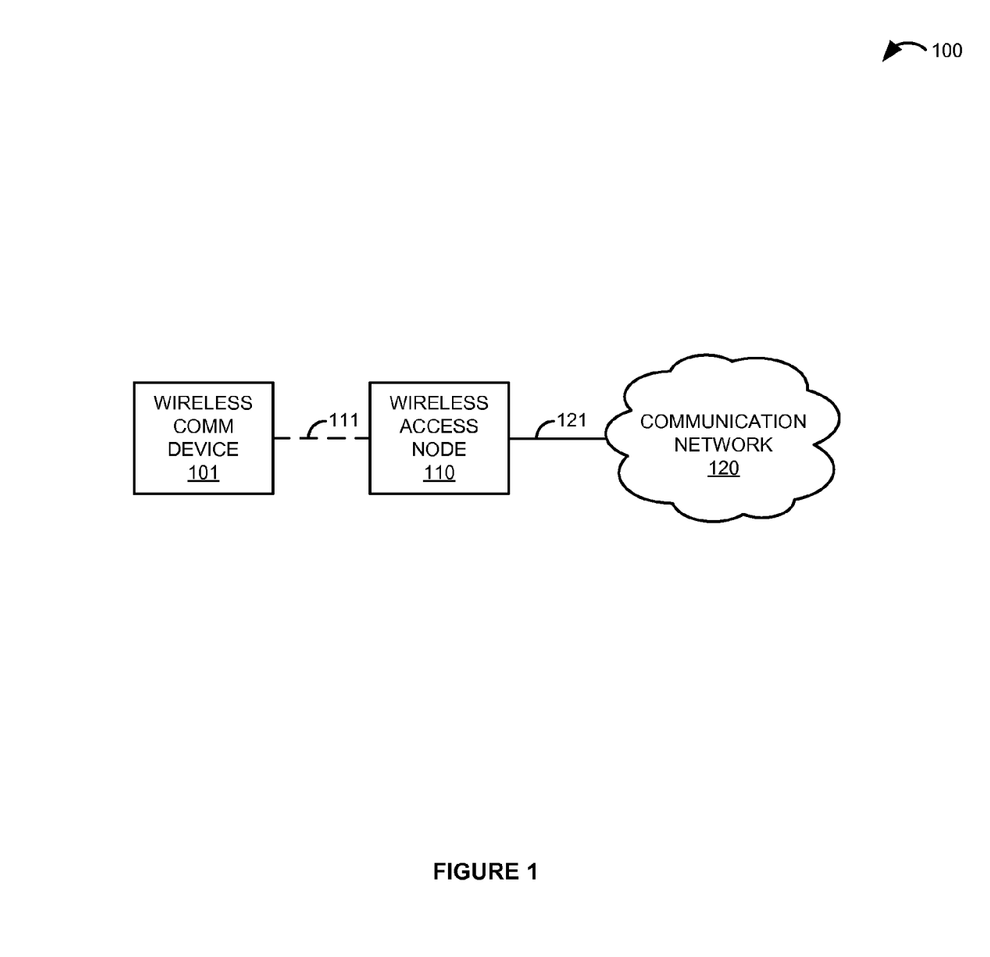
FIG. 1 is a block diagram that illustrates a communication system.

FIG. 1 is a block diagram that illustrates communication system 100. Communication system 100 includes wireless communication device 101, wireless access node 110, and communication network 120. Wireless communication device 101 and wireless access node 110 are in communication over wireless communication link 111. Wireless access node 110 and communication network 120 are in communication over communication link 121.

Figure 2:
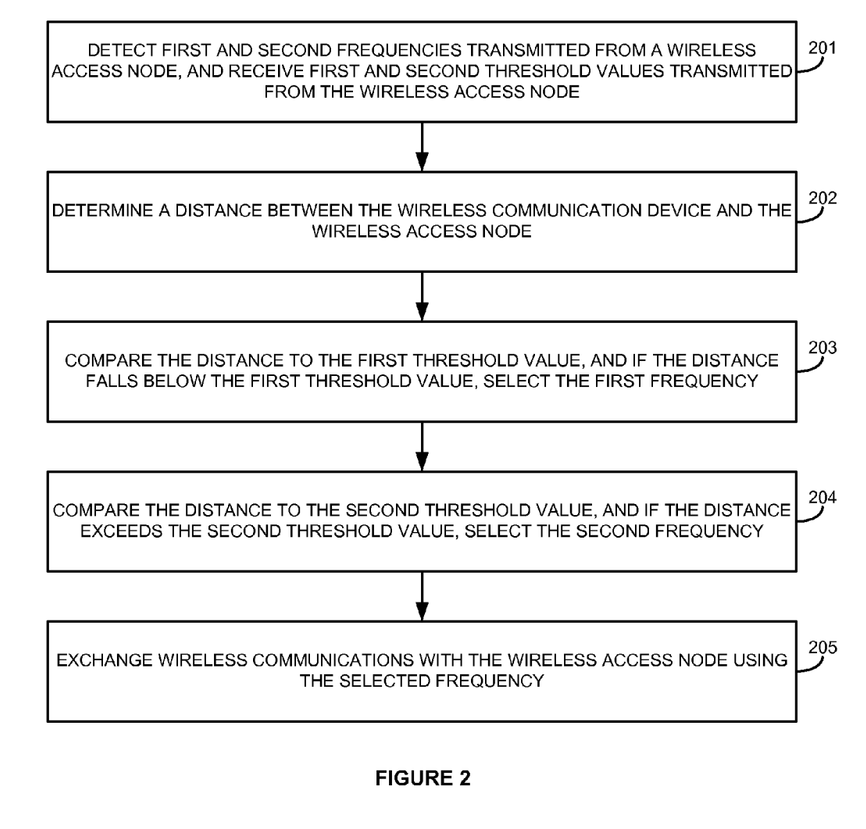
FIG. 2 is a flow diagram that illustrates an operation of the communication system.

FIG. 2 is a flow diagram that illustrates an operation of communication system 100. The steps of the operation are indicated below parenthetically. In particular, the operation of FIG. 2 shows a method of operating wireless communication device 101 to select a frequency for exchanging wireless communications with wireless access node 110.

In FIG. 2, wireless communication device 101 detects first and second frequencies transmitted from wireless access node 110 (201). For example, wireless communication device 101 could scan for available radio frequency (RF) signals being simultaneously transmitted by wireless access node 110 in order to detect the first and second frequencies. Wireless communication device 101 also receives first and second threshold values transmitted from wireless access node 110 (201). The first and second threshold values comprise distance thresholds for wireless access node 110. Typically, wireless access node 110 broadcasts the first and second threshold values in signaling or overhead messages. In some examples, wireless communication device 101 receives the first and second threshold values while scanning for wireless access node 110, based on messaging exchanged with wireless access node 110, or from some other information received from wireless access node 110. Further, the second threshold value could exceed the first threshold value and the first frequency could exceed the second frequency, and in some examples, wireless access node 110 could determine the first and second threshold values based on communication loading levels associated with the first and second frequencies.

Wireless communication device 101 determines a distance between wireless communication device 101 and wireless access node 110 (202). Wireless communication device 101 could utilize a variety of techniques to determine the distance between device 101 and wireless access node 110. For example, wireless communication device 101 could determine the distance based on a round trip delay between wireless communication device 101 and wireless access node 110. In some examples, wireless communication device 101 could determine the distance based on the locations of wireless communication device 101 and wireless access node 110. For example, to determine the location for distance calculations, wireless communication device 101 could utilize a global positioning system, triangulation or multilateration techniques, cell identification techniques such as cell of origin and control plane locating, course location messages, which provide the latitude and longitude of a serving network sector of wireless access node 110, or any other location determination technique. Wireless communication device 101 could also receive the location of wireless access node 110 that may be broadcast in the overhead or other messaging from node 110, for example. Wireless communication device 101 could then determine the distance to wireless access node 110 based on the locations of wireless communication device 101 and wireless access node 110.

Wireless communication device 101 then compares the distance to the first threshold value, and if the distance falls below the first threshold value, wireless communication device 101 selects the first frequency (203). To determine if the distance falls below the first threshold, wireless communication device 101 compares the distance between device 101 and wireless access node 110 to the threshold distance indicated by the first threshold value. For example, if the first threshold value is one mile, and the distance between wireless communication device 101 and wireless access node 110 is less than one mile, device 101 would select the first frequency.

Wireless communication device 101 also compares the distance to the second threshold value, and if the distance exceeds the second threshold value, wireless communication device 101 selects the second frequency (204). Wireless communication device 101 determines if the distance exceeds the second threshold by comparing the distance between device 101 and wireless access node 110 to the threshold distance indicated by the second threshold value in a similar manner to the first threshold value as previously discussed. For example, if the second threshold value is two miles, and the distance between wireless communication device 101 and wireless access node 110 is three miles, device 101 would select the second frequency. The first and second thresholds received by wireless communication device 101 could include instructions for device 101 to select the first frequency if the distance falls below the first threshold and to select the second frequency if the distance exceeds the second threshold, but wireless communication device 101 could also be preprogrammed with these instructions in some examples. Of course, although the present disclosure refers to the distance falling below the first threshold or exceeding the second threshold, one of skill in the art will understand that wireless communication device 101 could be configured to handle borderline distance values that fall directly on the first or second thresholds, so that references to falling below and/or exceeding a threshold as used herein could also comprise meeting the threshold in some examples. Moreover, wireless communication device 101 could be configured to compare the distance to other threshold values in addition to the first and second thresholds, and could select from additional frequencies based on these distance comparisons.

Once a frequency is selected, wireless communication device 101 exchanges wireless communications with wireless access node 110 using the selected frequency (205). For example, wireless communication device 101 could activate an antenna or transceiver that is configured to communicate in the selected frequency band in order to exchange wireless communications with wireless access node 110. In some examples, wireless communication device 101 might initiate a handoff to wireless access node 110 by scanning for the selected frequency of the RF signal being transmitted by wireless access node 110, and exchange the wireless communications with node 110 after a successful handoff.

In some examples, if the distance exceeds the first threshold value but falls below the second threshold value, wireless communication device 101 could transmit a request for a selection of the first and second frequencies for delivery to wireless access node 110. In response, wireless access node 110 could select the frequency for wireless communication device 101 based on several factors, including communication loading levels associated with the first and second frequencies, an altitude of wireless communication device 101, or any other criteria—including combinations thereof. For example, if the distance from wireless communication device 101 to wireless access node 110 lies between the first and second threshold values, wireless communication device 101 could determine a quality of an RF signal measured between wireless communication device 101 and wireless access node 110, and transmit the quality of the RF signal and a location of wireless communication device 101 for delivery to wireless access node 110. Wireless access node 110 could then determine the altitude of wireless communication device 101 based on the location of device 101, the quality of the RF signal between wireless communication device 101 and wireless access node 110, and an RF signal quality prediction at the altitude using clutter information. In addition, wireless access node 110 could determine the altitude of wireless communication device 101 based on the location of device 101 and geographic topography at the location. Once wireless access node 110 has determined the altitude of wireless communication device 101, node 110 can select between the first and second frequencies based on the altitude of device 101 to provide an optimal frequency selection for device 101.

Advantageously, wireless communication device 101 can select a frequency to exchange wireless communications with wireless access node 110 based on the distance thresholds broadcast by node 110. By determining the distance between wireless communication device 101 and wireless access node 110, device 101 can compare this distance to the first and second threshold values to determine which of the first and second frequencies to select for a subsequent communication session with wireless access node 110. In this manner, wireless communication traffic on wireless access node 110 may be better distributed over the available frequencies being transmitted by node 110, resulting in greater efficiency for RF resource utilization.

Referring back to FIG. 1, wireless communication device 101 could comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others—including combinations thereof. Wireless network protocols that may be utilized by wireless access node 110 include CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof.

Communication network 120 comprises the core network of a wireless communication service provider, and could include routers, gateways, telecommunication switches, servers, processing systems, or other communication equipment and systems for providing communication and data services. Communication network 120 could comprise wireless communication nodes, telephony switches, Internet routers, network gateways, computer systems, communication links, or some other type of communication equipment—including combinations thereof. Communication network 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 120 may be configured to communicate over metallic, wireless, or optical links—including combinations thereof. Communication network 120 may be configured to use time-division multiplexing (TDM), Internet Protocol (IP), Ethernet, optical networking, wireless protocols, communication signaling, or some other communication format—including combinations thereof. In some examples, communication network 120 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication link 121 uses metal, air, space, optical fiber such as glass or plastic, or some other material as the transport medium—including combinations thereof. Communication link 121 could use various communication protocols, such as TDM, IP, Ethernet, telephony, optical networking, hybrid fiber coax (HFC), communication signaling, wireless protocols, or some other communication format—including combinations thereof. Communication link 121 may be a direct link or could include intermediate networks, systems, or devices.

Figure 3:
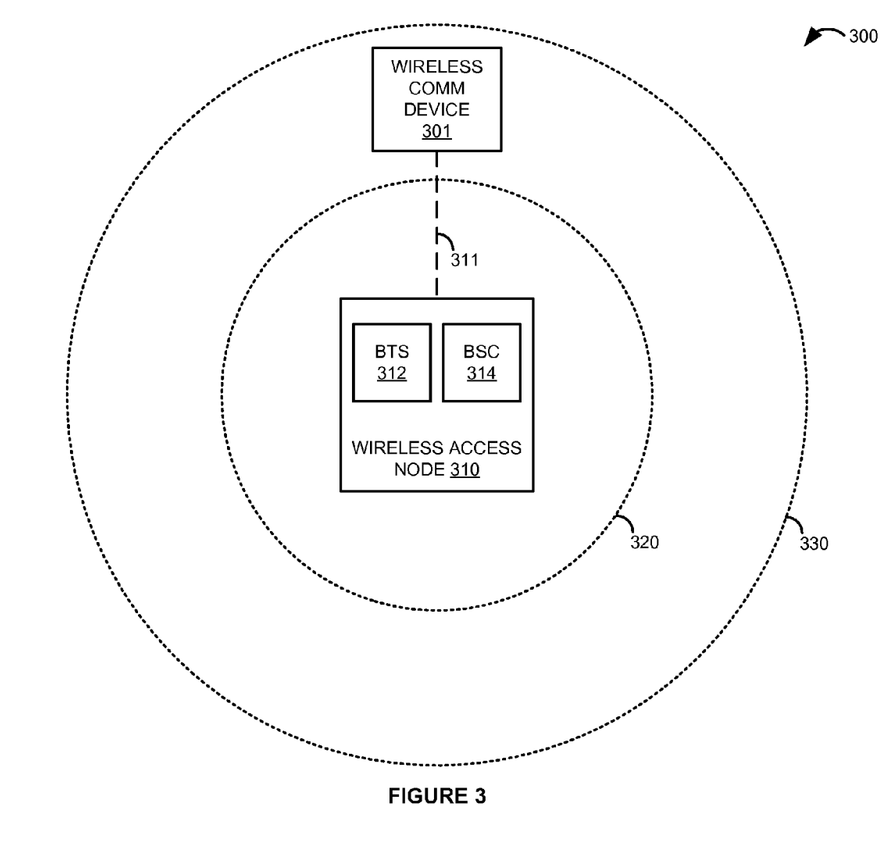
FIG. 3 is a block diagram that illustrates a communication system in an exemplary embodiment.

FIG. 3 is a block diagram that illustrates communication system 300. Communication system 300 includes wireless communication device 301 and wireless access node 310. Wireless communication device 301 and wireless access node 310 are in communication over wireless communication link 311. Wireless access node 310 includes base transceiver station (BTS) 312 and base station controller (BSC) 314. In some examples, BTS 312 and BSC 314 of wireless access node 310 could comprise a single device or could be distributed across multiple devices—including devices in different geographic areas.

Thresholds 320 and 330 comprise distance values relative to the location of BTS 312 with approximate boundary lines as indicated by the dotted lines on FIG. 3. The thresholds 320 and 330 shown in FIG. 3 are circular, suggesting the thresholds 320 and 330 each comprise a radius of distance surrounding BTS 312 in this example, but one of skill in the art will understand that the distance thresholds 320 and 330 could be defined using different techniques in other examples. The distance values of thresholds 320 and 330 are typically determined based on the RF signal frequencies transmitted by BTS 312. For example, BSC 314 could determine the thresholds 320 and 330 based on the signal propagation and penetration characteristics of frequencies transmitted by BTS 312, and BTS 312 could broadcast these thresholds 320 and 330 to wireless communication device 301. In this example, BTS 312 transmits at a first frequency of 1900 megahertz (MHz) and at a second frequency of 800 MHz. Since the higher frequency band of 1900 MHz has shorter propagation characteristics but better signal penetration than the second frequency of 800 MHz, the first threshold 320 could be set to a distance within range of the 1900 MHz signal transmitted by BTS 312. Likewise, the second threshold 330 could be set to a distance best served by the farther signal propagation characteristics of the 800 MHz signal. For purposes of this example, the first threshold 320 is set to a one mile radius and the second threshold 330 is set to a three mile radius surrounding BTS 312.

Figure 4:
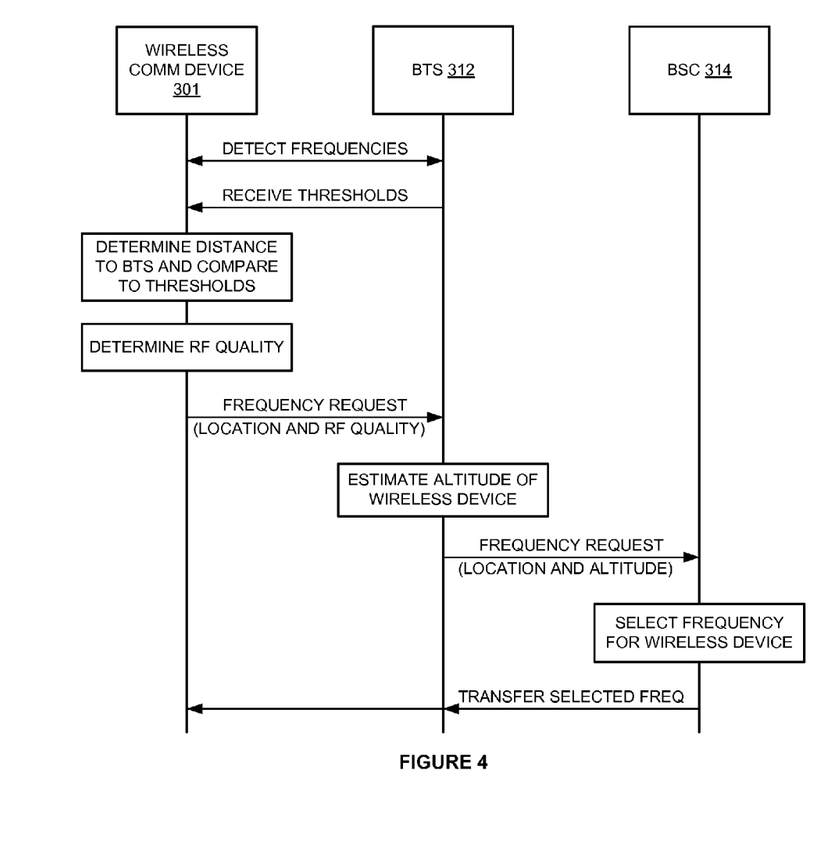
FIG. 4 is a sequence diagram that illustrates an operation of the communication system in an exemplary embodiment.

FIG. 4 is a sequence diagram that illustrates an operation of communication system 300 in an exemplary embodiment. The operation of FIG. 4 begins with wireless communication device 301 detecting the RF signal frequencies being transmitted by BTS 312. Wireless communication device 301 also receives the distance thresholds 320 and 330 broadcast by BTS 312. As previously discussed with respect to FIG. 3, the frequencies transmitted by BTS 312 are 800 MHz and 1900 MHz, threshold 320 is a one mile radius, and threshold 330 is a three mile radius surrounding BTS 312 in this example.

Wireless communication device 301 then determines the distance between device 301 and BTS 312. For example, wireless communication device 301 could receive the latitude and longitude coordinates of BTS 312 as part of the signaling overhead being broadcast by BTS 312, determine the location of device 301 based on various location determination techniques, such as GPS, triangulation, and others, and could then calculate the distance between wireless communication device 301 and BTS 312 based on the respective locations of device 301 and BTS 312. In other examples, wireless communication device 301 could transfer a data packet to BTS 312 and receive an acknowledgement of receipt of the data packet from BTS 312 to determine a round trip delay time, and determine the distance between device 301 and BTS 312 based on the roundtrip delay.

Once the distance between wireless communication device 301 and BTS 312 is determined, wireless communication device 301 compares the distance to the distance thresholds 320 and 330 to select a frequency for device 301 to exchange wireless communications with BTS 312. In particular, if the distance falls below threshold 320, wireless communication device 301 would select the higher frequency of 1900 MHz, but if the distance exceeds threshold 330, device 301 would select the lower frequency of 800 MHz for its farther propagation characteristics. For example, if the distance between wireless communication device 301 and BTS 312 is one thousand feet, this distance would fall below the one mile radius of threshold 320, so device 301 would select the 1900 MHz frequency for communicating with BTS 312. Similarly, if the distance between wireless communication device 301 and BTS 312 is four miles, this distance would exceed the three mile radius of threshold 330, so device 301 would select the 800 MHz frequency. However, in this example, wireless communication device 301 is located two miles away from BTS 312, which falls between the one mile radius of threshold 320 and the three mile radius of threshold 330.

Since the distance between wireless communication device 301 and BTS 312 neither falls below threshold 320 nor exceeds threshold 330 as shown in FIG. 3, wireless communication device 301 requests wireless access node 310 to select the frequency for wireless communications. Prior to requesting the frequency selection from wireless access node 310, wireless communication device 301 determines a quality of an RF signal between device 301 and BTS 312. For example, wireless communication device 301 could measure the RF signal characteristics of the 800 MHz and/or the 1900 MHz frequency bands transmitted by BTS 312, and determine the RF quality of either of these signals between device 301 and BTS 312. Wireless communication device 301 then transfers a frequency request to BTS 312 and includes the location of device 301 and the measured RF quality between device 301 and BTS 312 in the request. For example, wireless communication device 301 could provide the latitude and longitude coordinates of device 301 along with a received signal strength indicator (RSSI), a carrier to interference plus noise ratio (CINR), or any other indication of the RF quality between wireless communication device 301 and BTS 312 to provide the location and the quality of the RF signal to BTS 312.

In response to receiving the frequency request, BTS 312 processes the location of wireless communication device 301 and the quality of the RF signal between device 301 and BTS 312 to estimate the altitude of wireless communication device 301. In particular, BTS 312 estimates the altitude of wireless communication device 301 based on RF signal quality predictions at various altitudes using clutter information, which provides indications of RF signal utilization at different geographic locations identified by latitude and longitude. For example, BTS 312 could calculate the coverage level of the forward and reverse link communication channels at the location of wireless communication device 301 for different altitudes relative to a ground location based on the clutter information to determine RF signal quality predictions at various altitudes for device 301. BTS 312 could then compare the quality of the RF signal measured by wireless communication device 301 to the predicted signal qualities for the different altitudes at the location of device 301 to estimate the altitude of device 301. For example, by matching the RF signal quality observed by wireless communication device 301 to one of the signal quality predictions for different altitudes at the location of device 301, BTS 312 can estimate the distance above ground that device 301 is presently operating.

Once BTS 312 has estimated the altitude of wireless communication device 301, BTS 312 transfers a frequency request to BSC 314 that instructs BSC 314 to select a frequency for device 301. BTS 312 includes the altitude and the location of wireless communication device 301 in the request. BSC 314 processes the altitude and location of wireless communication device 301 to select the frequency for device 301. For example, based on geographic topography information at the location of wireless communication device 301, BSC 314 could determine if device 301 is presently located in urban or rural areas, mountainous regions, forestland, empty fields, bodies of water, and other types of geographic areas and land topographies. BSC 314 could then compare the altitude estimation for wireless communication device 301 to altitude thresholds for the location, and select between the frequencies based on signal propagation, penetration, and other characteristics. For example, if the altitude indicates that wireless communication device 301 is located five hundred feet above ground in an urban center location, BSC 314 could infer that device 301 is operating in a high-rise building and select the higher frequency of 1900 MHz for better signal penetration into the building. In another example, if the location indicates a rural area for wireless communication device 301 operating at a ground level altitude, BSC 314 might select the lower frequency of 800 MHz for better signal propagation.

In some examples, BSC 314 may additionally or alternatively select between frequencies for wireless communication device 301 based on communication loading levels per sector for each the frequencies. BSC 314 could also apply a hash function to the mobile identification number (MIN) or other device identifier of wireless communication device 301 to select a random frequency for device 301. In some example, BTS 312 could be configured to transmit a fourth generation (4G) wireless signal on one of the frequencies and a third generation (3G) wireless signal on the other, so that in cases where wireless communication device 301 comprises a dual-mode device capable of communicating with both 3G and 4G networks, BSC 314 effectively selects either 3G or 4G service for device 301 when selecting the frequency. Of course, if BTS 312 transmits more than two frequencies, BSC 314 could be configured to select from theses additional frequencies for device 301 in a similar manner as described above.

Once BSC 314 selects the frequency for wireless communication device 301, BSC 314 transfers the selected frequency via BTS 312 for delivery to wireless communication device 301. In this manner, BTS 312 and BSC 314 of wireless access node 310 work together to assign the appropriate RF resource to wireless communication device 301. By providing a frequency selection for wireless communication device 301 based on the altitude of device 301 at its present location, BSC 314 enables device 301 to more efficiently utilize the RF communication channels transmitted by BTS 312.

Figure 5:
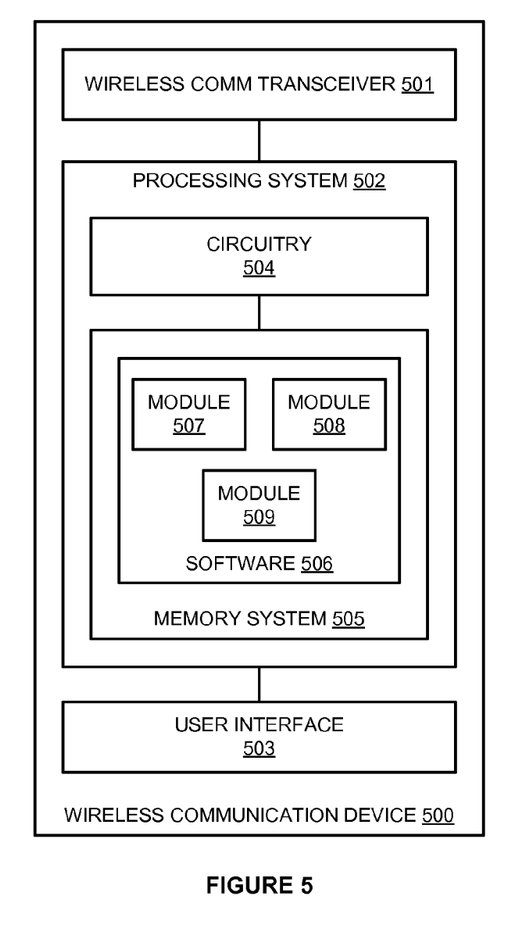
FIG. 5 is a block diagram that illustrates a wireless communication device.

FIG. 5 is a block diagram that illustrates wireless communication device 500. Wireless communication device 500 provides an example of wireless communication device 101, although device 101 could use alternative configurations. Wireless communication device 500 comprises wireless communication transceiver 501, processing system 502, and user interface 503. Processing system 502 is linked to wireless communication transceiver 501 and user interface 503. Processing system 502 includes processing circuitry 504 and memory system 505 that stores operating software 506. Operating software 506 comprises software modules 507-509. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceiver 501 comprises RF communication circuitry and an antenna. The RF communication circuitry typically includes an amplifier, filter, RF modulator, and signal processing circuitry. Wireless communication transceiver 501 may also include a memory system, software, processing circuitry, or some other communication device. Wireless communication transceiver 501 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication transceiver 501 is configured to detect first and second frequencies transmitted from a wireless access node and to receive first and second threshold values transmitted from the wireless access node. Further, wireless communication transceiver 501 is configured to exchange wireless communications with the wireless access node using a selected frequency.

User interface 503 comprises components that interact with a user to receive user inputs and to present media and/or information. User interface 503 may include a speaker, microphone, buttons, lights, display screen, touch screen, touch pad, scroll wheel, communication port, or some other user input/output apparatus—including combinations thereof. User interface 503 may be omitted in some examples.

Processing circuitry 504 comprises microprocessor and other circuitry that retrieves and executes operating software 506 from memory system 505. Processing circuitry 504 may comprise a single device or could be distributed across multiple devices—including devices in different geographic areas. Processing circuitry 504 may be embedded in various types of equipment. Memory system 505 comprises a non-transitory computer readable storage medium, such as a disk drive, flash drive, data storage circuitry, or some other hardware memory apparatus. Memory system 505 may comprise a single device or could be distributed across multiple devices—including devices in different geographic areas. Memory system 505 may be embedded in various types of equipment. Processing circuitry 504 is typically mounted on a circuit board that may also hold memory system 505 and portions of communication transceiver 501 and user interface 503. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 507-509, although software 506 could have alternative configurations in other examples.

When executed by processing circuitry 504, operating software 506 directs processing system 502 to operate wireless communication device 500 as described herein for wireless communication device 101. In particular, operating software 506 directs processing system 502 to direct wireless communication transceiver 501 to detect first and second frequencies transmitted from a wireless access node and to receive first and second threshold values transmitted from the wireless access node. In addition, operating software 506 directs processing system 502 to determine a distance between wireless communication device 500 and the wireless access node, compare the distance to the first threshold value, and if the distance falls below the first threshold value, select the first frequency. Further, operating software 506 directs processing system 502 to compare the distance to the second threshold value, and if the distance exceeds the second threshold value, select the second frequency. Operating software 506 directs processing system 502 to direct wireless communication transceiver 501 to exchange wireless communications with the wireless access node using the selected frequency.

In this example, operating software 506 comprises a transceiver driver software module 507 that detects first and second frequencies transmitted from a wireless access node, receives first and second threshold values transmitted from the wireless access node, and exchanges wireless communications with the wireless access node using a selected frequency. Additionally, operating software 506 comprises a distance determination software module 508 that determines a distance between wireless communication device 500 and the wireless access node. Operating software 506 also comprises a frequency selection software module 509 that compares the distance to the first threshold value, and if the distance falls below the first threshold value, selects the first frequency, and compares the distance to the second threshold value, and if the distance exceeds the second threshold value, selects the second frequency.

Figure 6:
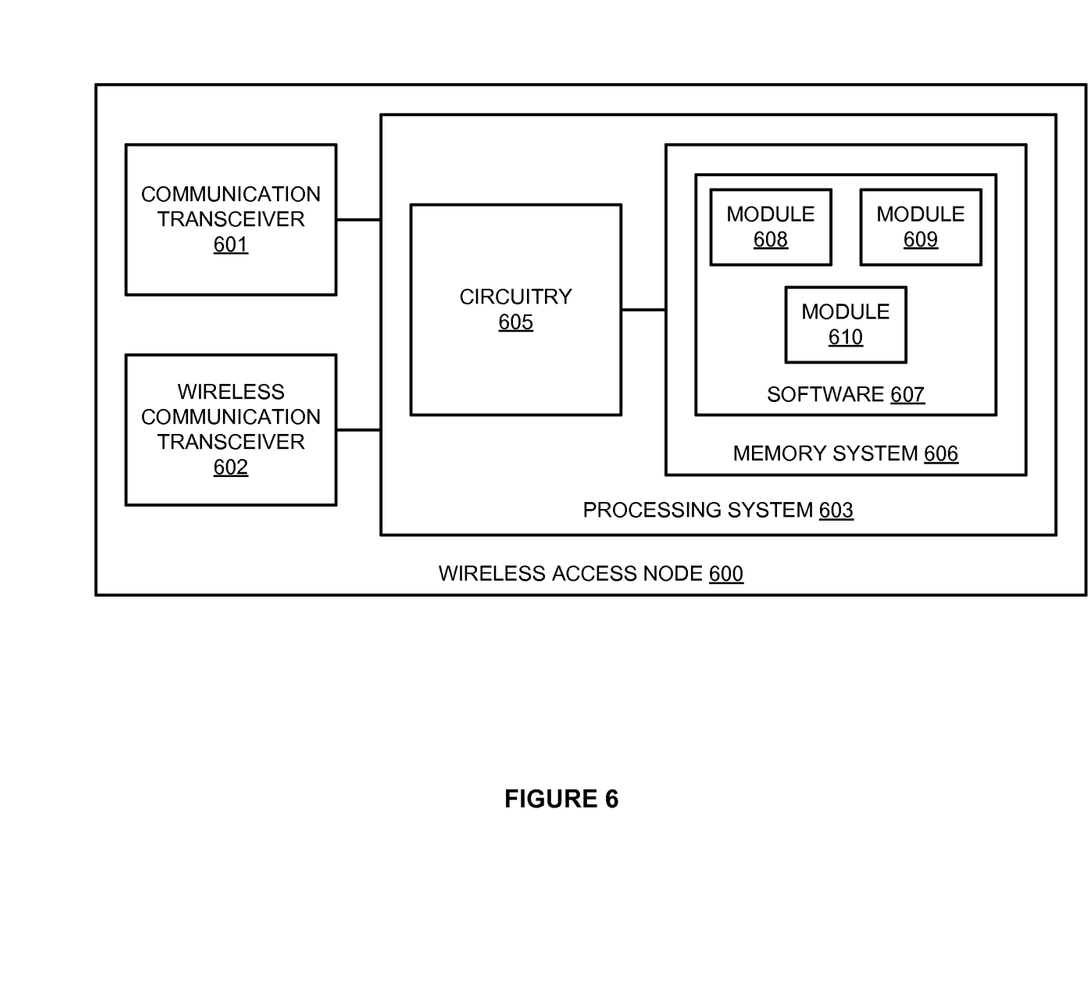
FIG. 6 is a block diagram that illustrates a wireless access node.

FIG. 6 is a block diagram that illustrates wireless access node 600. Wireless access node 600 provides an example of wireless access nodes 110 and 310, although nodes 110 and 310 may use alternative configurations. Wireless access node 600 comprises communication transceiver 601, wireless communication transceiver 602, and processing system 603. Processing system 603 is linked to communication transceiver 601 and wireless communication transceiver 602. Processing system 603 includes processing circuitry 605 and memory system 606 that stores operating software 607. Operating software 607 comprises software modules 608-610.

Communication transceiver 601 comprises components that communicate over communication links, such as network cards, ports, RF transceivers, processing circuitry and software, or some other communication components. Communication transceiver 601 may be configured to communicate over metallic, wireless, or optical links. Communication transceiver 601 may be configured to use TDM, IP, Ethernet, optical networking, wireless protocols, communication signaling, or some other communication format—including combinations thereof.

Wireless communication transceiver 602 comprises RF communication circuitry and an antenna. The RF communication circuitry typically includes an amplifier, filter, RF modulator, and signal processing circuitry. Wireless communication transceiver 602 may also include a memory system, software, processing circuitry, or some other communication device. Wireless communication transceiver 602 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication transceiver 602 is configured to transmit first and second frequencies and first and second threshold values, and to exchange wireless communications with a wireless communication device using a selected frequency. Further, wireless communication transceiver 602 could be configured to receive a request for a selection of the first and second frequencies transmitted from the wireless communication device.

Processing circuitry 605 comprises microprocessor and other circuitry that retrieves and executes operating software 607 from memory system 606. Processing circuitry 605 may comprise a single device or could be distributed across multiple devices—including devices in different geographic areas. Processing circuitry 605 may be embedded in various types of equipment. Memory system 606 comprises a non-transitory computer readable storage medium, such as a disk drive, flash drive, data storage circuitry, or some other hardware memory apparatus. Memory system 606 may comprise a single device or could be distributed across multiple devices—including devices in different geographic areas. Memory system 606 may be embedded in various types of equipment. Operating software 607 comprises computer programs, firmware, or some other form of machine-readable processing instructions. Operating software 607 may include an operating system, utilities, drivers, network interfaces, applications, or some other type of software. In this example, operating software 607 comprises software modules 608-610, although software 607 could have alternative configurations in other examples.

When executed by circuitry 605, operating software 607 directs processing system 603 to operate as described herein for wireless access nodes 110 and 310. In particular, operating software 607 may direct processing system 603 to direct wireless communication transceiver 602 to transmit first and second frequencies and first and second threshold values, and to receive a request for a selection of the first and second frequencies transmitted from a wireless communication device. Further, operating software 607 may direct processing system 603 to select between the first and second frequencies based on an altitude of the wireless communication device. Operating software 607 also directs processing system 603 to direct wireless communication transceiver 602 to exchange wireless communications with the wireless communication device using a selected frequency.

In this example, operating software 607 comprises a transceiver driver software module 608 that transmits first and second frequencies and first and second threshold values, and exchanges wireless communications with a wireless communication device using a selected frequency. Additionally, operating software 607 comprises a request receiver software module 609 that receives a request for a selection of the first and second frequencies transmitted from a wireless communication device. Further, operating software 607 also comprises a frequency selection software module 610 that selects between the first and second frequencies based on an altitude of the wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising:
a wireless communication transceiver configured to detect first and second frequencies transmitted from a wireless access node and to receive first and second threshold values transmitted from the wireless access node, wherein the second threshold value exceeds the first threshold value, and wherein the first frequency exceeds the second frequency;
a processing system comprising circuitry configured to determine a distance between the wireless communication device and the wireless access node, compare the distance to the first threshold value, and if the distance falls below the first threshold value, select the first frequency;
the processing system configured to compare the distance to the second threshold value, and if the distance exceeds the second threshold value, select the second frequency; and
the wireless communication transceiver configured to exchange wireless communications with the wireless access node using the selected frequency.

2. The wireless communication device of claim 1 further comprising the processing system configured to, if the distance exceeds the first threshold value but falls below the second threshold value, direct the wireless communication transceiver to transmit a request for a selection of the first and second frequencies for delivery to the wireless access node, wherein the wireless access node is configured to select between the first and second frequencies based on an altitude of the wireless communication device.

3. The wireless communication device of claim 2 wherein the wireless access node is configured to select between the first and second frequencies based on communication loading levels associated with the first and second frequencies.

4. The wireless communication device of claim 2 wherein the processing system is configured to determine a quality of a radio frequency (RF) signal measured between the wireless communication device and the wireless access node, and wherein the wireless communication transceiver is configured to transmit the quality of the RF signal and a location of the wireless communication device for delivery to the wireless access node.

5. The wireless communication device of claim 4 wherein the wireless access node is configured to determine the altitude of the wireless communication device based on the location of the wireless communication device, the quality of the RF signal between the wireless communication device and the wireless access node, and an RF signal quality prediction at the altitude using clutter information.

6. The wireless communication device of claim 4 wherein the wireless access node is configured to determine the altitude of the wireless communication device based on the location of the wireless communication device and geographic topography at the location.

7. The wireless communication device of claim 1 wherein the processing system configured to determine the distance between the wireless communication device and the wireless access node comprises the processing system configured to determine the distance based on a round trip delay between the wireless communication device and the wireless access node.

8. The wireless communication device of claim 1 wherein the processing system configured to determine the distance between the wireless communication device and the wireless access node comprises the processing system configured to determine the distance based on a global positioning system.

9. The wireless communication device of claim 1 wherein the wireless access node is configured to determine the first and second threshold values based on communication loading levels associated with the first and second frequencies.

10. A method of operating a wireless communication device, the method comprising:
    detecting first and second frequencies transmitted from a wireless access node;
    receiving first and second threshold values transmitted from the wireless access node that determines the first and second threshold values based on communication loading levels associated with the first and second frequencies, wherein the second threshold value exceeds the first threshold value;
    determining a distance between the wireless communication device and the wireless access node;
    comparing the distance to the first threshold value, and if the distance falls below the first threshold value, selecting the first frequency;
    comparing the distance to the second threshold value, and if the distance exceeds the second threshold value, selecting the second frequency; and
    exchanging wireless communications with the wireless access node using the selected frequency.

11. The method of claim 10 further comprising, if the distance exceeds the first threshold value but falls below the second threshold value, transmitting a request for a selection of the first and second frequencies for delivery to the wireless access node, wherein the wireless access node is configured to select between the first and second frequencies based on an altitude of the wireless communication device.

12. The method of claim 11 wherein the wireless access node is configured to select between the first and second frequencies based on communication loading levels associated with the first and second frequencies.

13. The method of claim 11 further comprising determining a quality of a radio frequency (RF) signal measured between the wireless communication device and the wireless access node, and transmitting the quality of the RF signal and a location of the wireless communication device for delivery to the wireless access node.

14. The method of claim 13 wherein the wireless access node is configured to determine the altitude of the wireless communication device based on the location of the wireless communication device, the quality of the RF signal between the wireless communication device and the wireless access node, and an RF signal quality prediction at the altitude using clutter information.

15. The method of claim 13 wherein the wireless access node is configured to determine the altitude of the wireless communication device based on the location of the wireless communication device and geographic topography at the location.

16. The method of claim 10 wherein determining the distance between the wireless communication device and the wireless access node comprises determining the distance based on a round trip delay between the wireless communication device and the wireless access node.

17. The method of claim 10 wherein determining the distance between the wireless communication device and the wireless access node comprises determining the distance based on a global positioning system.

18. A wireless communication device comprising:
    a wireless communication transceiver configured to detect first and second frequencies transmitted from a wireless access node and to receive first and second threshold values transmitted from the wireless access node, wherein the second threshold value exceeds the first threshold value and wherein the first frequency exceeds the second frequency;
    a processing system comprising circuitry configured to determine a distance between the wireless communication device and the wireless access node, compare the distance to the first threshold value, and if the distance falls below the first threshold value, select the first frequency;
    the processing system configured to compare the distance to the second threshold value, and if the distance exceeds the second threshold value, select the second frequency;
    if the distance exceeds the first threshold value but falls below the second threshold value, the processing system configured to direct the wireless communication transceiver to transmit a request for a selection of the first and second frequencies for delivery to the wireless access node, wherein the wireless access node is configured to select between the first and second frequencies based on an altitude of the wireless communication device; and
    the wireless communication transceiver configured to exchange wireless communications with the wireless access node using the selected frequency.

* * * * *